Dec. 13, 1955  R. C. LASSIAT  2,726,938
APPARATUS FOR SUPPLYING CONTACT MATERIAL
TO A REACTION CHAMBER
Filed April 26, 1954
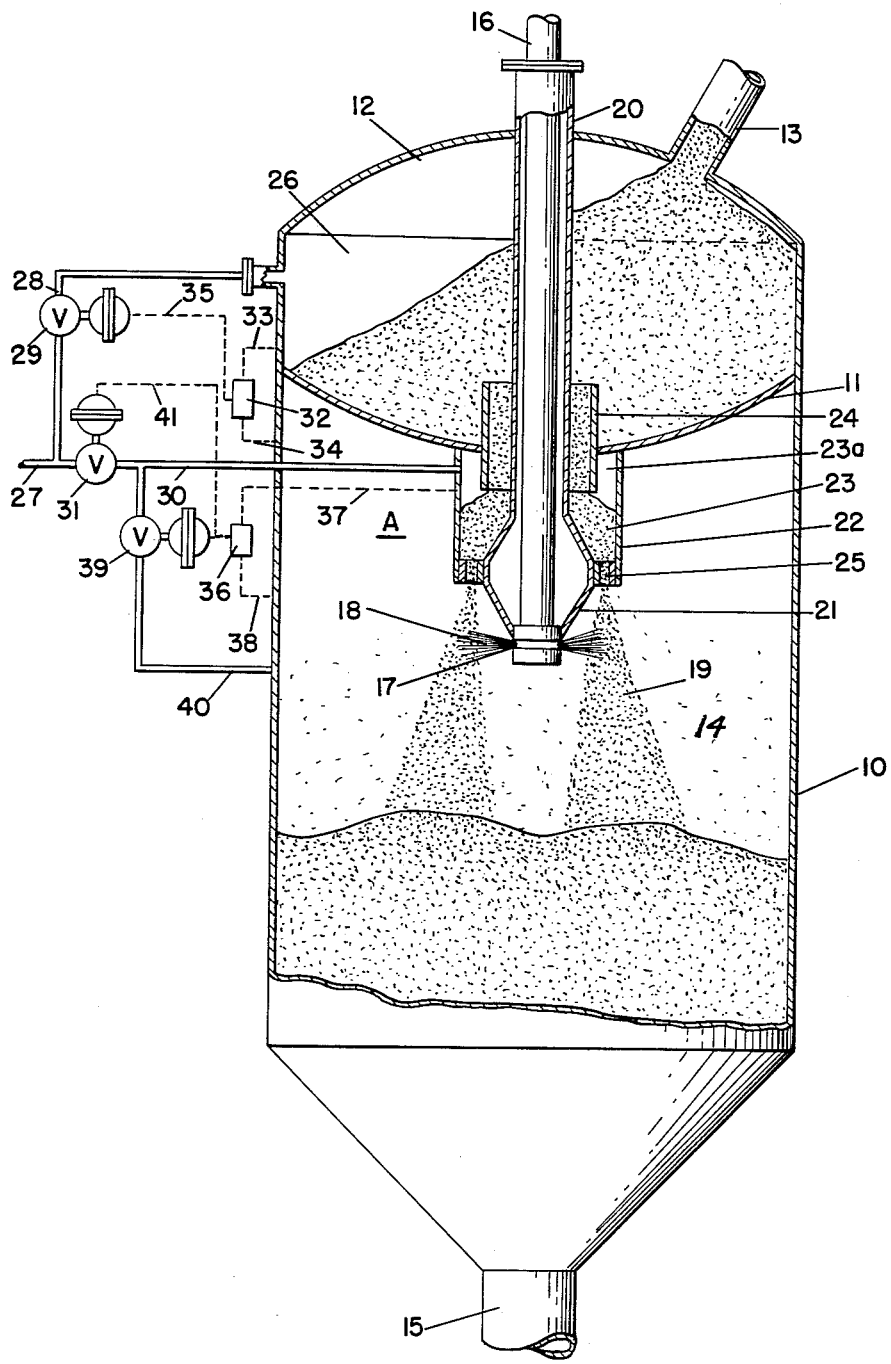
INVENTOR.
RAYMOND C. LASSIAT
BY
Besser and Harding
ATTORNEYS

United States Patent Office 2,726,938
Patented Dec. 13, 1955

2,726,938
APPARATUS FOR SUPPLYING CONTACT MATERIAL TO A REACTION CHAMBER

Raymond C. Lassiat, Swarthmore, Pa., assignor to Sun Oil Company, Philadelphia, Pa., a corporation of New Jersey Application April 26, 1954, Serial No. 425,589

3 Claims. (Cl. 23—288)

This invention relates to a system for effecting reactions wherein catalytic or contact material is circulated continuously through several units in which are effected the reactions. In particular the invention is directed to apparatus for controlling the supply of the catalyst or contact material to a reactor unit.

For a complete understanding of the invention reference is made to the single figure of the drawing wherein is shown a vessel 10 which for the purpose of illustration may be considered to be utilized in the transformation of higher boiling liquid hydrocarbons to lower boiling products wherein the contact material utilized would be catalytic in nature.

The present invention is particularly applicable to the type of unit shown which is partitioned at 11 to provide an upper chamber 12 into which is delivered contact material or catalyst through line 13 from another unit (not shown) of the system. A reaction chamber 14 is provided therebelow and the contact material is removed from the reaction chamber by line 15 and directed to another unit of the system, for example, a regeneration reactor (not shown).

In the specific design of the unit an arrangement is provided for supplying the liquid or mixed phase charge and the contact material to the reaction chamber 14 simultaneously. The charge is supplied by a conduit 16 extending downwardly through the contact material zone 12 and having its lower end apertured at 17 in order that the liquid supply will pass radially outwardly in the form of a spray as indicated at 18. The reactant products may be removed from the reaction chamber in any desired manner.

The contact material is supplied to the chamber 14 in the form of an annular curtain 19 and to this end a sleeve 20 is preferably provided about the charge supply conduit 16 having its upper end secured to the top of the vessel and terminating at its lower end in a flared-out and flared-in portion 21 which cooperates with a casing 22 secured to and depending from the partition 11 to form a compartment 23 with the sleeve 20. Of course the sleeve 20 could be dispensed with and the flared-out and flared-in portion 21 could be secured directly to the lower portion of conduit 16. Between the sleeve 20 and casing 22 is a discharge nozzle 24 having an upper open end within the upper chamber 12 and a lower open end extending through the partition to be disposed within the compartment 23 for supplying contact material thereto from upper chamber 12. The flared-out and flared-in portion 21 of the sleeve 20 cooperates with the lower end of casing 22 in providing an annular opening 25 through which catalyst is directed from the compartment 23 in an annular curtain 19 downwardly into the reaction chamber 14 and during its downward movement passes through the sprays 18. The lower end of the discharge nozzle 24 which extends into the compartment 23 provides a space 23a above the material in the compartment while the contact material admitted to the upper chamber 12 through the conduit 13 will acquire an angle of repose and provide an empty zone therein, such as space 26. The configuration of space 26 will depend on the manner of admitting the material to chamber 12.

In order to maintain the reactants in chamber 14 and prevent their migrating to chamber 12 and thence through line 13, a sealing fluid, such as steam or flue gas is admitted to space 26 above the body of contact material from supply line 27 through line 28 and diaphragm valve 29. A differential pressure regulator 32 has one pressure line 33 in communication with space 26 while another pressure line 34 is in communication with space A in the reaction chamber 14 and a control line 35 is connected between the pressure regulator 32 and valve 29. The controls are so adjusted that the pressure in space 26 is maintained slightly above the pressure in space A causing the major part of the sealing fluid to flow upwardly through line 13 the upper end portion of which is usually maintained at or near atmospheric pressure while a minor portion of the sealing fluid flows downwardly through nozzle 24 to space 23a exerting pressure on the catalyst therebelow in chamber 23.

In order to regulate the flow of catalyst through orifice 25, additional sealing medium is admitted from supply line 27 to space 23a through line 30 and diaphragm valve 31. Sealing medium may be also vented from space 23a into space A in the reaction chamber 14 through line 30, valve 39 and vent line 40. A second pressure regulator 36, having pressure connections 37 and 38 connected to space 23a and chamber A respectively, and control line 41 to valves 31 and 39 controls the differential pressure between space 23a and chamber A. At very low differential pressure on regulator 36, valve 31 is closed and valve 39 is opened in order to vent sealing medium flowing from space 23a into space A above the contact material in reaction chamber 14. The catalyst flows then by gravity through orifice 25 and the minimum rate of catalyst is supplied to reaction chamber 14. As differential pressure is increased valve 39 closes and valve 31 is opened by controller 36, introducing additional sealing medium in space 23a. The pressure exerted on the catalyst by this additional sealing medium increases the flow through orifice 25 thus providing an arrangement to control the supply of catalyst or contact material to the reaction chamber 14 from the upper chamber 12. Let it be assumed that the pressure in the upper chamber 12 over that in the lower reaction chamber A is just adequate to prevent the migration of reactants to the upper chamber 12 and thence into and through the pipe 13 supplying contact material to upper chamber 12, so that gravity is the main force for supplying contact material from the upper chamber to the lower reaction chamber A. If, now, it be desired to increase that rate of flow of contact material, it can be effected to a limited degree by increasing the pressure in the upper chamber relative to that in the lower chamber A, but any substantial increase in flow so determined may allow gas communication between the pipe 13 and the upper chamber 12, which it is desirable should remain sealed against passage of reactants from chamber A. However, by increasing the pressure in the chamber 23a relative to the pressure in the reaction chamber, such rate of flow of contact material will be increased. It will be understood that the relative pressures in the upper chamber 12 and the lower reaction chamber A are controlled by the pressure controller 32 (which in turn controls valve 29) and that the relative pressures in the chamber 23a and the lower reaction chamber A are controlled by the pressure controller 36 (which in turn controls valves 31 and 39). It will thus be understood that the rate of flow of the contact material to the lower reaction chamber may be predetermined with precision by proper setting of the pressure controllers.

The level of the contact material within chamber 14 can be maintained constant or within predetermined limits by any known means.

This application is a continuation of copending application Serial No. 199,167 filed December 5, 1950, now abandoned.

The invention claimed is:

1. Apparatus for hydrocarbon conversion which comprises: an upright conversion vessel; a partition thereacross providing an upper chamber for contact material and a lower reaction chamber; a reactant conduit having its outlet end disposed within the reaction chamber to supply reactants thereto; means for supplying contact material to said upper chamber; a compartment beneath said partition and communicating with said upper chamber through a restricted passageway, said compartment being adapted to receive contact material from said upper chamber and having at its lower end an annular restricted contact material outlet above said outlet end of said reactant conduit and extending around said reactant conduit, said contact material outlet being adapted to discharge contact material into said reaction chamber; means for maintaining a higher pressure in said upper chamber than in said reaction chamber; a fluid supply conduit in communication with said compartment; a valve in said supply conduit; a vent conduit communicating with said reaction chamber and adapted to withdraw fluid from said compartment; a valve in said vent conduit; a differential pressure regulator; a pressure line therefrom in communication with said compartment; a second pressure line from said pressure regulator in communication with said reaction chamber; and control lines from said pressure regulator to the valve in said supply conduit and to the valve in said vent conduit to vary the flow of contact material into the reaction chamber.

2. In converter apparatus comprising an upright vessel, a partition thereacross providing an upper chamber for contact material and a lower reaction chamber, a reactant conduit extending generally centrally through the upper chamber and having its outlet end disposed within the reaction chamber to supply reactants thereto, a contact material conduit communicating with said upper chamber and spaced from the reactant conduit to supply material to said upper chamber in a manner to provide an upper space therein above the level of the material, a casing having its upper end secured to said partition and its lower end depending within the reaction chamber, a sleeve which, surrounding the lower end portion of said reactant conduit provides with the lower end of said casing a compartment within the reaction chamber, the lower end of said sleeve and the lower end of said casing being spaced apart to provide communication between the compartment and the reaction chamber, a discharge nozzle secured in said partition and having an upper open end positioned within the upper chamber and an open lower end positioned within said compartment above the lower end of said casing providing a confined space in the compartment, means for controlling the rate of flow of contact material from the upper chamber to the reaction chamber which comprises a fluid supply conduit in communication with said confined space in the compartment, a valve in said supply conduit, a lower branch conduit between the valve in the supply conduit and the reaction chamber, a valve in said branch conduit, a differential pressure regulator, a pressure line therefrom in communication with the confined space in the compartment, a second pressure line from the pressure regulator in communication with the reaction chamber, control lines from the pressure regulator to said valves in the supply conduit and the branch conduit for varying the flow of contact material into the reaction chamber.

3. The apparatus as in claim 2 further characterized by an upper branch conduit from said supply conduit to the upper space, a valve in said upper branch conduit, a pressure regulator connected to said valve, a pressure line from the regulator to the upper space and another pressure line from the regulator to the reaction chamber.

References Cited in the file of this patent

UNITED STATES PATENTS 2,592,479    Sinclair et al. _____ Apr. 8, 1952